Dec. 30, 1924.
R. M. HUTTON
ELECTRIC GROUND CLAMP
Filed Jan. 27, 1921
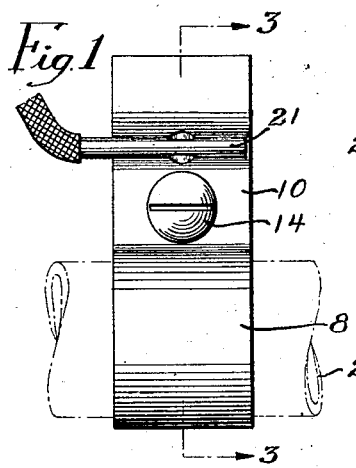
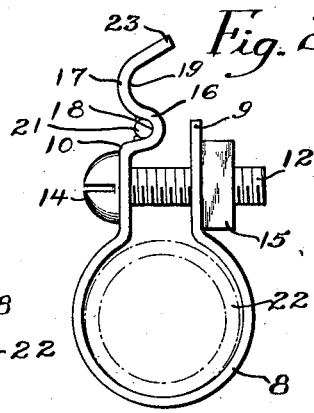
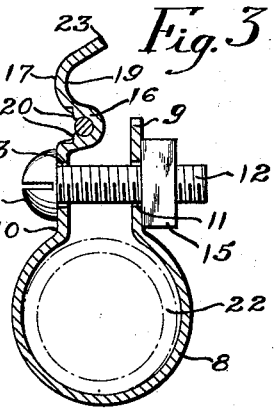
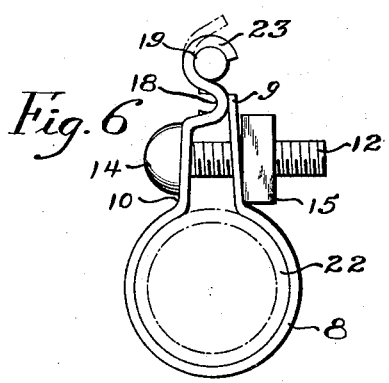
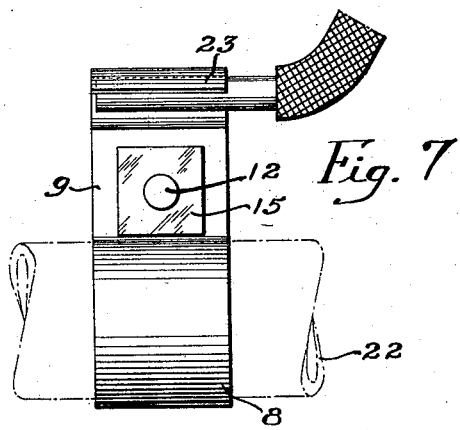
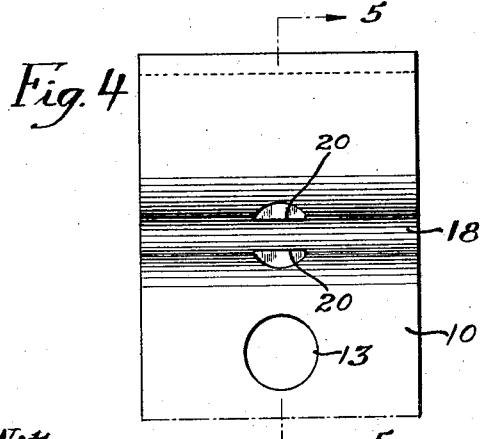
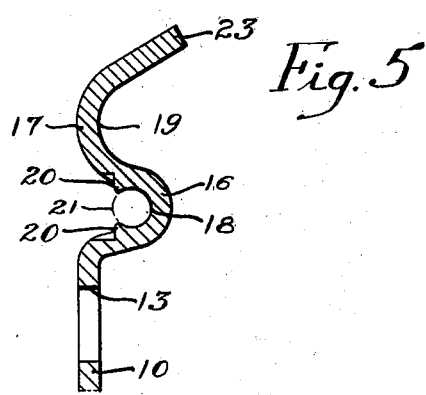
Witnesses,
Spencer W. Megonegal,
Augustin B. Coppes
Inventor,
Raymond M. Hutton,
by Joshua R. H. Potts
his Attorney.

Patented Dec. 30, 1924.

1,520,868

UNITED STATES PATENT OFFICE.

RAYMOND M. HUTTON, OF PHILADELPHIA, PENNSYLVANIA.

ELECTRIC GROUND CLAMP.

Application filed January 27, 1921. Serial No. 440,253.

*To all whom it may concern:*

Be it known that I, RAYMOND M. HUTTON, a citizen of the United States, residing at Philadelphia, in the county of Philadelphia and State of Pennsylvania, have invented certain new and useful Improvements in Electric Ground Clamps, of which the following is a specification.

One object of my invention is to provide an improved electric ground clamp which will facilitate the grounding and bonding of electric conduit and other piping.

Another object is to make my improved clamp of a durable and simple construction and which will expedite the work of electricians and insure good, strong and durable connections.

These objects, and other advantageous ends which will be described hereinafter, I attain in the following manner, reference being had to the accompanying drawings in which Figure 1 is a side elevation of my improved clamp showing the same with an electric conduit wire having been pushed therein and automatically held to the clamp, Figure 2 is an end view of Figure 1, Figure 3 is a section taken on the line 3—3 of Figure 1, Figure 4 is an enlarged face view of a portion of my improved clamp as it appears with no wire therein, Figure 5 is a section taken on the line 5—5 of Figure 4, Figure 6 is an end view showing how my improved clamp can be employed to connect a large conduit wire in another portion, and Figure 7 is a side view of Figure 6.

Referring to the drawings, my improved clamp includes a partial ring or band portion 8 which terminates in two free end portions 9 and 10 normally spaced apart and extending outward from the band portion 8. The end portion 9 is preferably made straight and flat and is provided with a hole 11 through which a clamping bolt 12 extends. This clamping bolt also passes through a hole 13 directly opposite the hole 11 in a substantially parallel flat part 14 of the end portion 10. The end of the bolt 12 adjacent the part 14 is preferably provided with a kerfed head so that it can be turned with a screw driver, and an angular nut 15 on the bolt is adapted to engage the outer face of the end portion 9; the nut being of such size that an attempt to turn will cause its edge to engage the band portion 8, as is clearly obvious from the construction shown in the drawing.

The end portion 10 beyond the part 14 is bent in a serpentine or sinuous manner to provide an inwardly extending loop 16 and an outwardly extending loop 17. The inwardly extending loop 16 provides an outer groove or channel 18 and the outwardly projecting loop 17 provides an inner groove or channel 19; said groove 19 preferably being made larger than the groove 18. The band and end portions are preferably made of a single piece of sheet metal bent in the form illustrated and may be of any suitable size according to the diameter of pipe to which the clamp is to be attached.

I provide inwardly projecting lugs 20 which are opposed to each other and extend from the inner opposed side surfaces of the groove 18. These lugs are preferably made by a punch or other pressure device being forced partway into the metal so as to press parts of the metal at the opposite sides of the grooves toward each other and spaced from the innermost portion of the groove. These lugs 20 serve automatically to hold a conduit wire 21 within the groove 18 after the conduit wire has been forced so as to temporarily spread the loop 16 to permit the wire to pass between the lugs into the innermost portion of the groove and then the loop, due to its resilience, springs back into its normal position with the lugs 20 holding the wire 21 within the groove, after which the wire may be soldered within the groove and it is an easy matter for an electrician who desires to join a wire, such as 21, to the clamp merely to press the wire into the position as above stated. The electrician can then conveniently and quickly solder the wire and is relieved of the necessity of holding the wire in the groove while he is soldering. The band portion 8 can be secured to the pipe, which is illustrated in dot-and-dash lines at 22, by tightening on the bolt 12 to move the end portions 9 and 10 toward each other. If desired to secure a conduit wire within the groove 19 of the loop 17, it is merely necessary to insert the wire within the groove 19 and if desired the extreme end 23 can be bent over as shown in Figures 6 and 7 and the wire can be soldered.

I preferably make the groove 19 comparatively large so that it may be used for electric conduit wire of larger capacity than capable of being held in the groove 18 of the same clamp. However, it will be understood that these clamps can be made of various sizes so as to suit piping and electric conduit wires of a large range of diameters.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A clamp of the character described including a partial ring portion and end portions projecting upwardly therefrom and spaced apart, one of said end portions being bent to provide inwardly and outwardly projecting loops whereby grooves are formed for the reception of electric conduit wires; and means for moving said end portions toward each other whereby the device can be secured to a pipe extending through said partial ring portion; substantially as described.

2. A clamp of the character described including a partial ring portion and end portions extending therefrom and spaced apart, one of the ends being bent to provide a groove and a loop to receive conduit wires; lugs struck up from the opposite sides of the groove adapted to grasp the wire, and means for moving the end portions toward each other whereby the device may be secured to a pipe; substantially as described.

3. A clamp of the character described including a partial ring portion and end portions extending therefrom and spaced apart, one of the ends being bent to provide an inwardly projecting groove and a loop to receive conduit wires, the other end being adapted to engage the part forming the groove; lugs struck up from the opposite sides of the groove adapted to grasp the wire, and means for moving the end portions toward each other whereby the device may be secured to a pipe; substantially as described.

4. A clamp of the character described including a partial ring portion and end portions extending therefrom and spaced apart, one of the ends being bent to provide a groove for reception of a conduit wire; inwardly pressed lugs in the sides of the groove adapted to embrace the greater portion of the circumference of the wire and hold it within the groove, and means for moving the end portions toward each other whereby the device may be secured to a pipe, substantially as described.

In testimony whereof I have signed my name to this specification in the presence of two subscribing witnesses.

RAYMOND M. HUTTON.

Witnesses:
  Chas. E. Potts,
  Elizabeth Garbe.